US012025747B2

(12) United States Patent
Lu

(10) Patent No.: US 12,025,747 B2
(45) Date of Patent: Jul. 2, 2024

(54) SENSOR-BASED CONTROL OF LIDAR RESOLUTION CONFIGURATION

(71) Applicant: Atieva, Inc., Newark, CA (US)

(72) Inventor: Qiang Lu, Foster City, CA (US)

(73) Assignee: Atieva, Inc., Newark, CA (US)

(*) Notice: Subject to any disclaimer, the term of this patent is extended or adjusted under 35 U.S.C. 154(b) by 399 days.

(21) Appl. No.: 17/444,424

(22) Filed: Aug. 4, 2021

(65) Prior Publication Data

US 2023/0044279 A1 Feb. 9, 2023

(51) Int. Cl.
*G01S 7/487* (2006.01)
*B60W 30/09* (2012.01)
*B60W 30/095* (2012.01)
*B60W 40/02* (2006.01)
*B60W 60/00* (2020.01)
(Continued)

(52) U.S. Cl.
CPC ......... *G01S 7/487* (2013.01); *B60W 30/0956* (2013.01); *B60W 40/02* (2013.01); *G01S 7/484* (2013.01); *G01S 17/86* (2020.01); *G01S 17/931* (2020.01); *G06F 18/251* (2023.01); *G06V 20/56* (2022.01); *B60W 30/09* (2013.01); *B60W 60/0015* (2020.02); *B60W 2420/408* (2024.01); *H04N 5/33* (2013.01)

(58) Field of Classification Search
CPC ........ G01S 7/487; G01S 7/484; G01S 7/4802; G01S 7/42; G01S 17/86; G01S 17/931; G01S 17/87; G01S 17/894; G01S 17/66; B60W 30/0956; B60W 30/09; B60W 40/02; B60W 60/0015; B60W 2420/52; G06F 18/251; G06V 20/56; H04N 5/33
See application file for complete search history.

(56) References Cited

U.S. PATENT DOCUMENTS 966,478 A 8/1910 Schaarschmidt
9,383,753 B1 7/2016 Templeton et al.
(Continued)

OTHER PUBLICATIONS

A. Aalerud et al.: "Reshaping Field of View and Resolution with Segmented Reflectors: Bridging the Gap between Rotating and Solid-State LiDARs," Sensors 2020, vol. 20, 3388, 26 pages.
(Continued)

*Primary Examiner* — Russell Frejd
(74) *Attorney, Agent, or Firm* — Brake Hughes Bellermann LLP

(57) ABSTRACT

A computer-implemented method comprises: generating first output using a first sensor of a vehicle comprising an infrared camera or an event-based sensor, the first output indicating a portion of surroundings of the vehicle; providing the first output to a LiDAR of the vehicle having a field of view (FOV); configuring a resolution of the LiDAR based at least in part on the first output; generating a representation of at least part of the surroundings of the vehicle using the LiDAR; providing, to a perception component of the vehicle, second output of a second sensor of the vehicle and third output of the LiDAR, the perception component configured to perform object detection, sensor fusion, and object tracking regarding the second and third outputs, wherein the first output bypasses at least part of the perception component; and performing motion control of the vehicle using a fourth output of the perception component.

33 Claims, 9 Drawing Sheets

(51) Int. Cl.
  *G01S 7/484*   (2006.01)
  *G01S 17/86*   (2020.01)
  *G01S 17/931*  (2020.01)
  *G06F 18/25*   (2023.01)
  *G06V 20/56*   (2022.01)
  *H04N 5/33*    (2023.01)

(56) References Cited

U.S. PATENT DOCUMENTS

| | | | |
|---|---|---|---|
| 10,310,064 | B2 | 6/2019 | Majumdar et al. |
| 10,345,447 | B1 | 7/2019 | Hicks |
| 10,551,838 | B2 | 2/2020 | Liu et al. |
| 10,638,109 | B2 | 4/2020 | Filippov |
| 10,974,730 | B2 | 4/2021 | Hu et al. |
| 11,392,134 | B1 * | 7/2022 | Ferdowsi ............... G01J 5/06 |
| 11,397,439 | B1 * | 7/2022 | Ferdowsi ............. G06V 10/25 |
| 2013/0314711 | A1 | 11/2013 | Cantin et al. |
| 2015/0153184 | A1 | 6/2015 | Mudalige et al. |
| 2018/0364333 | A1 | 12/2018 | Jungwirth et al. |
| 2018/0372875 | A1 | 12/2018 | Juelsgaard et al. |
| 2019/0079193 | A1 | 3/2019 | Gunnam |
| 2019/0086515 | A1 | 3/2019 | Sung |
| 2019/0107606 | A1 | 4/2019 | Russell et al. |
| 2019/0258251 | A1 | 8/2019 | Ditty et al. |
| 2019/0324124 | A1 | 10/2019 | O'Keeffe |
| 2020/0096639 | A1 | 3/2020 | Panas et al. |
| 2020/0134459 | A1 | 4/2020 | Zeng et al. |
| 2020/0217666 | A1 | 7/2020 | Zhang et al. |
| 2020/0284883 | A1 * | 9/2020 | Ferreira ............... G01S 7/4816 |
| 2020/0355820 | A1 | 11/2020 | Zeng et al. |
| 2021/0109197 | A1 | 4/2021 | O'Keeffe |
| 2021/0109523 | A1 | 4/2021 | Zou et al. |
| 2021/0141092 | A1 | 5/2021 | Chen et al. |

OTHER PUBLICATIONS

A. Steffora Mutschler: "Sensor Fusion Cahllenges in Cars," available online at <https://semiengineering.com/sensor-fusion-challenges-in-cars/>, Oct. 8, 2020, 8 pages.

D. Silver: "How the Udacity Self-Driving Car Works," available online at <https://medium.com/udacity/how-the-udacity-self-driving-car-works-575365270a40>, Sep. 6, 2017, 8 pages.

G. Cohen et al.: "Event-based Sensing for Space Situational Awareness," Advanced Maui Optical and Space Surveillance Technologies Conference (AMOS), 2017, 13 pages.

G. Gallego et al.: "Event-based Vision: a Survey," IEEE Transactions on Pattern Analysis and Machine Intelligence, Aug. 8, 2020, 30 pages.

J. Kocić et al: "Sensors and Sensor Fusion in Autonomous Vehicles," 2018 26th Telecommunications Forum (TELFOR), 2018, 4 pages.

O. Odukha: "The Way of Data: How Sensor Fusion and Data Compression Empower Autonomous Driving," available online at <https://intellias.com/the-way-of-data-how-sensor-fusion-and-data-compression-empower-autonomous-driving/>, Apr. 30, 2020, 12 pages.

International Search Report and Written Opinion for PCT Application No. PCT/US2022/074480, dated Nov. 25, 2022, 13 pages.

* cited by examiner

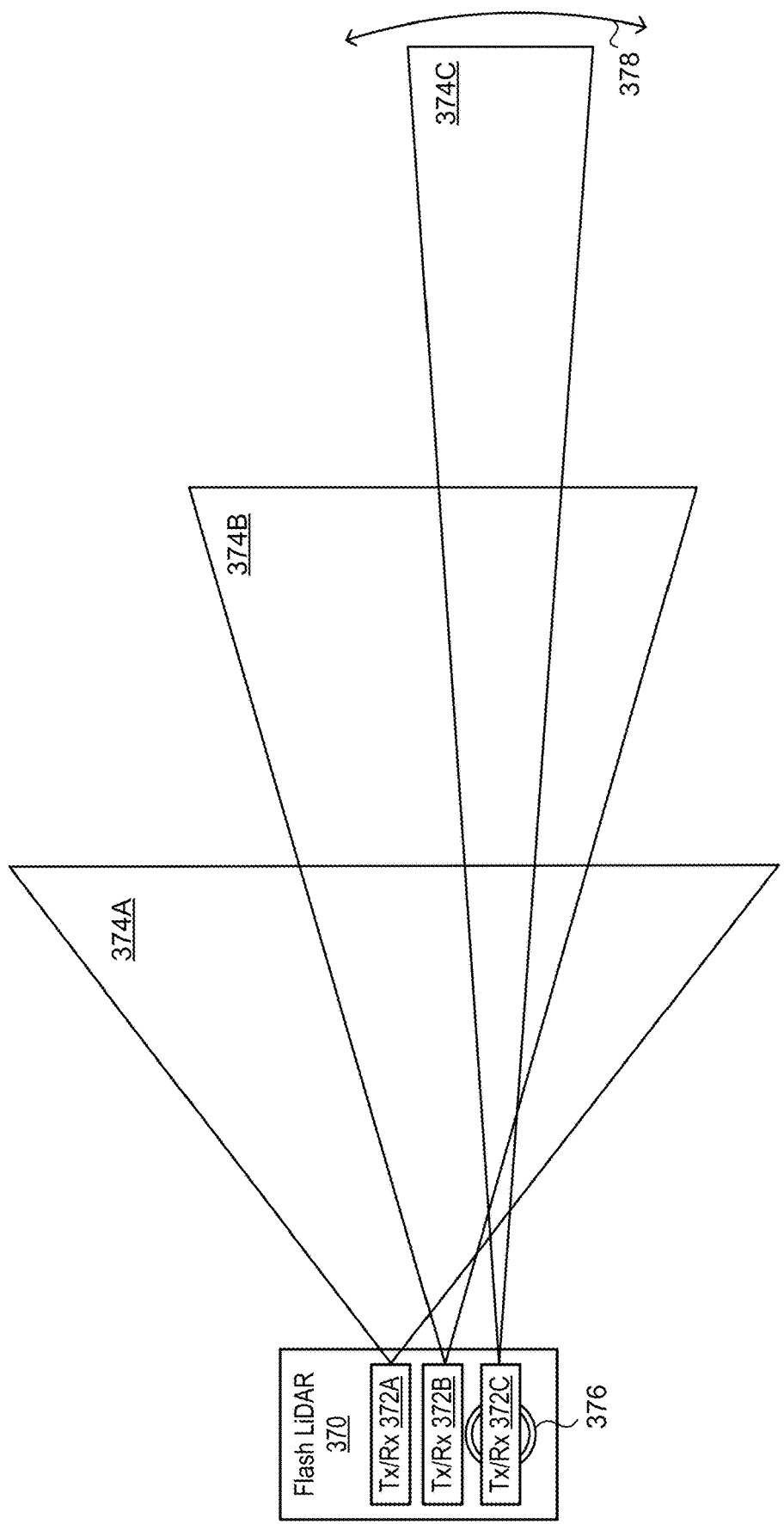

SENSOR-BASED CONTROL OF LIDAR RESOLUTION CONFIGURATION

TECHNICAL FIELD

This document relates to sensor-based control of a LiDAR resolution configuration.

BACKGROUND

Some vehicles manufactured nowadays are equipped with one or more types of systems that can at least in part handle operations relating to the driving of the vehicle. Some such assistance involves automatically surveying surroundings of the vehicle and being able to take action regarding detected vehicles, pedestrians, or objects. When the surveillance is performed during travel, a faster response time from the system is generally preferred as it may increase the amount of time available to take remedial action after detection.

SUMMARY

In a first aspect, a computer-implemented method comprises: generating a first output using a first sensor of a vehicle, the first sensor comprising at least one of an infrared camera or an event-based sensor, the first output indicating a portion of surroundings of the vehicle; providing the first output to a LiDAR of the vehicle, the LiDAR having a field of view (FOV); configuring a resolution of the LiDAR based at least in part on the first output; generating a representation of at least part of the surroundings of the vehicle using the LiDAR; providing, to a perception component of the vehicle, second output of a second sensor of the vehicle and third output of the LiDAR, the perception component configured to perform object detection, sensor fusion, and object tracking regarding the second and third outputs, wherein the first output bypasses at least part of the perception component; and performing motion control of the vehicle using a fourth output of the perception component.

Implementations can include any or all of the following features. The LiDAR is configured to operate using a higher-resolution region (HRR) within the FOV, the LiDAR having a higher resolution within the HRR than elsewhere in the FOV, and wherein configuring the resolution of the LiDAR comprises defining, using the LiDAR, a position of the HRR within the FOV based on the first output, wherein the representation includes the HRR in the FOV. Defining the position of the HRR based on the first output comprises positioning the HRR at a location of the portion of the surroundings in the representation of at least part of the surroundings. The first output includes coordinates for the portion of the surroundings, and wherein the HRR is positioned using the coordinates. Configuring the resolution of the LiDAR comprises adjusting a scanning rate of the LiDAR at the HRR. Configuring the resolution of the LiDAR comprises adjusting a laser pulse frequency of the LiDAR at the HRR. The LiDAR is a flash LiDAR having multiple fields of view, wherein the FOV is a first FOV of the multiple fields of view, and wherein configuring the resolution of the flash LiDAR comprises steering the first FOV toward the part of the surroundings. The first sensor is the infrared camera, and wherein the first output indicates that the portion of the surroundings has a different temperature than another portion of the surroundings. The infrared camera selects the portion of the surroundings to be indicated by the first output based on the portion of the surroundings having a greater temperature than the other portion of the surroundings. The first output includes only information identifying the portion of the surroundings, and does not identify the other portion of the surroundings. The first sensor is the event-based sensor, and wherein the first output indicates a different pixel change for the portion of the surroundings than for another portion of the surroundings. The event-based sensor selects the portion of the surroundings to be indicated by the first output based on the portion of the surroundings having a greater pixel change than the other portion of the surroundings. The first output includes only information identifying the portion of the surroundings, and does not identify the other portion of the surroundings. The second sensor is at least one of the infrared camera or the event-based sensor. The second sensor is not any of the infrared camera or the event-based sensor. Generating the first output further includes performing a transformation using the perception component.

In a second aspect, a system comprises: a first sensor to generate a first output, the first sensor comprising at least one of an infrared camera or an event-based sensor, the first output indicating a portion of surroundings of the system; and a LiDAR having a field of view (FOV), wherein the LiDAR receives the first output generated by the first sensor and configures a resolution of the LiDAR based at least in part on the first output.

Implementations can include any or all of the following features. The LiDAR generates a representation of at least part of the surroundings. The LiDAR is configured to operate using a higher-resolution region (HRR) within the FOV, the LiDAR having a higher resolution within the HRR than elsewhere in the FOV, and wherein the LiDAR defines a position of the HRR within the FOV based on the first output, and wherein the representation includes the HRR in the FOV. The LiDAR adjusts a scanning rate of the LiDAR at the HRR. The LiDAR adjusts a laser pulse frequency of the LiDAR at the HRR. The LiDAR is a flash LiDAR having multiple fields of view, wherein the HRR corresponds to a first FOV of the multiple fields of view, and wherein the LiDAR configures the resolution by steering the HRR toward the part of the surroundings. The first output includes coordinates for the portion of the surroundings, and wherein the LiDAR positions the HRR using the coordinates. The first sensor is the infrared camera, and wherein the first output indicates that the portion of the surroundings has a different temperature than another portion of the surroundings. The infrared camera selects the portion of the surroundings to be indicated by the first output based on the portion of the surroundings having a greater temperature than the other portion of the surroundings. The first output includes only information identifying the portion of the surroundings, and does not identify the other portion of the surroundings. The first sensor is the event-based sensor, and wherein the first output indicates a different motion of the portion of the surroundings than another portion of the surroundings. The event-based sensor selects the portion of the surroundings to be indicated by the first output based on the portion of the surroundings having greater motion than the other portion of the surroundings. The first output includes only information identifying the portion of the surroundings, and does not identify the other portion of the surroundings. The system further comprises: a perception component to receive second output of a second sensor of the system and third output of the LiDAR, the perception component to perform object detection, sensor fusion, and object tracking regarding the second and third outputs, wherein the first output bypasses at least part of the perception component. The second sensor is not any of the infrared camera or the event-based sensor. The perception component in part includes a transformation component, and wherein the first output is transformed using the transformation component before being received by the LiDAR. The first sensor and the LiDAR are positioned within a common housing of the system.

BRIEF DESCRIPTION OF DRAWINGS

FIG. 3C shows another example of a flash LiDAR.

Like reference symbols in the various drawings indicate like elements.

DETAILED DESCRIPTION

Figure 1:
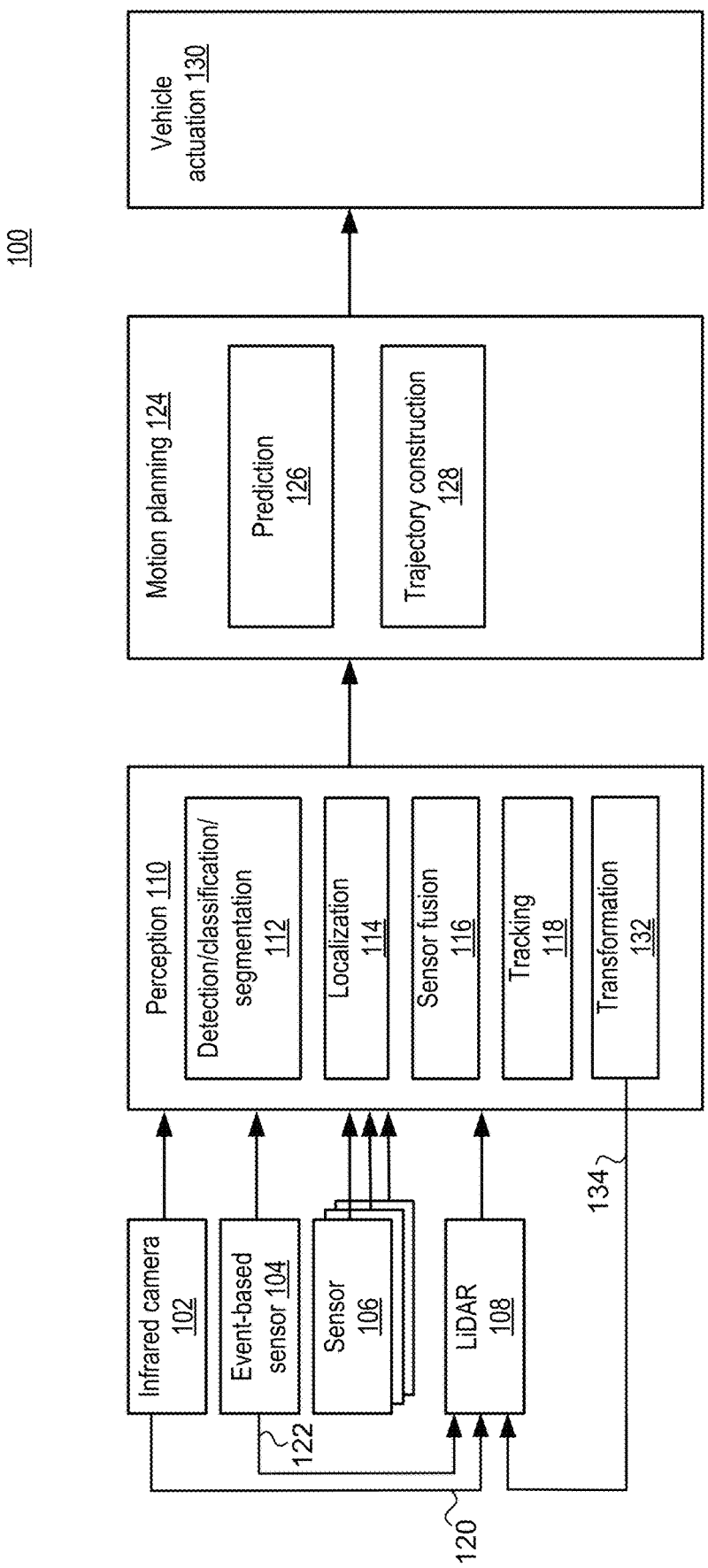
FIG. 1 shows an example of a system.

This document describes examples of systems and techniques for performing sensor-based control of a LiDAR resolution configuration. For example, the resolution of the LiDAR in one or more areas can be controlled. In some implementations, a perception component based on hardware and software performs object detection, sensor fusion, and object tracking regarding input signals from a LiDAR and/or other sensors. The LiDAR may be configured to operate using a higher-resolution region within its field of view. An infrared camera and/or an event-based sensor can be used for prompting the LiDAR to configure its resolution by positioning the higher-resolution region relative to the field of view. This approach can be significantly faster than using the perception component for controlling the LiDAR in this regard. Accordingly, the output from the infrared camera and/or the event-based sensor can bypass the perception component.

Examples herein refer to a vehicle. A vehicle is a machine that transports passengers or cargo, or both. A vehicle can have one or more motors using at least one type of fuel or other energy source (e.g., electricity). Examples of vehicles include, but are not limited to, cars, trucks, and buses. The number of wheels can differ between types of vehicles, and one or more (e.g., all) of the wheels can be used for propulsion of the vehicle. The vehicle can include a passenger compartment accommodating one or more persons. At least one vehicle occupant can be considered the driver; various tools, implements, or other devices, can then be provided to the driver. In examples herein, any person carried by a vehicle can be referred to as a "driver" or a "passenger" of the vehicle, regardless whether the person is driving the vehicle, or whether the person has access to controls for driving the vehicle, or whether the person lacks controls for driving the vehicle. Vehicles in the present examples are illustrated as being similar or identical to each other for illustrative purposes only.

Examples herein refer to assisted driving. In some implementations, assisted driving can be performed by an assisted-driving (AD) system, including, but not limited to, an autonomous-driving system. For example, an AD system can include an advanced driving-assistance system (ADAS). Assisted driving involves at least partially automating one or more dynamic driving tasks. An ADAS can perform assisted driving and is an example of an assisted-driving system. Assisted driving is performed based in part on the output of one or more sensors typically positioned on, under, or within the vehicle. An AD system can plan one or more trajectories for a vehicle before and/or while controlling the motion of the vehicle. A planned trajectory can define a path for the vehicle's travel. As such, propelling the vehicle according to the planned trajectory can correspond to controlling one or more aspects of the vehicle's operational behavior, such as, but not limited to, the vehicle's steering angle, gear (e.g., forward or reverse), speed, acceleration, and/or braking.

While an autonomous vehicle is an example of a system that performs assisted driving, not every assisted-driving system is designed to provide a fully autonomous vehicle. Several levels of driving automation have been defined by SAE International, usually referred to as Levels 0, 1, 2, 3, 4, and 5, respectively. For example, a Level 0 system or driving mode may involve no sustained vehicle control by the system. For example, a Level 1 system or driving mode may include adaptive cruise control, emergency brake assist, automatic emergency brake assist, lane-keeping, and/or lane centering. For example, a Level 2 system or driving mode may include highway assist, autonomous obstacle avoidance, and/or autonomous parking. For example, a Level 3 or 4 system or driving mode may include progressively increased control of the vehicle by the assisted-driving system. For example, a Level 5 system or driving mode may require no human intervention of the assisted-driving system.

Examples herein refer to a sensor. A sensor is configured to detect one or more aspects of its environment and output signal(s) reflecting the detection. The detected aspect(s) can be static or dynamic at the time of detection. As illustrative examples only, a sensor can indicate one or more of a distance between the sensor and an object, a speed of a vehicle carrying the sensor, a trajectory of the vehicle, or an acceleration of the vehicle. A sensor can generate output without probing the surroundings with anything (passive sensing, e.g., like an image sensor that captures electromagnetic radiation), or the sensor can probe the surroundings (active sensing, e.g., by sending out electromagnetic radiation and/or sound waves) and detect a response to the probing. Examples of sensors that can be used with one or more embodiments include, but are not limited to: a light sensor (e.g., a camera); a light-based sensing system (e.g., LiDAR); a radio-based sensor (e.g., radar); an acoustic sensor (e.g., an ultrasonic device and/or a microphone); an inertial measurement unit (e.g., a gyroscope and/or accelerometer); a speed sensor (e.g., for the vehicle or a component thereof); a location sensor (e.g., for the vehicle or a component thereof); an orientation sensor (e.g., for the vehicle or a component thereof); an inertial measurement unit; a torque sensor; a temperature sensor (e.g., a primary or secondary thermometer); a pressure sensor (e.g., for ambient air or a component of the vehicle); a humidity sensor (e.g., a rain detector); or a seat occupancy sensor.

Examples herein refer to a LiDAR. As used herein, a LiDAR includes any object detection system that is based at least in part on light, wherein the system emits the light in one or more directions. The light can be generated by a laser and/or by a light-emitting diode (LED), to name just two examples. The LiDAR can emit light pulses in different directions (e.g., characterized by different polar angles and/or different azimuthal angles) so as to survey the surroundings. For example, one or more laser beams can be impinged on an orientable reflector for aiming of the laser pulses. In some implementations, a LiDAR can include a frequency-modulated continuous wave (FMCW) LiDAR. For example, the FMCW LiDAR can use non-pulsed scanning beams with modulated (e.g., swept or "chirped") frequency, wherein the beat between the emitted and detected signals is determined. The LiDAR can detect the return signals by a suitable sensor to generate an output. As used herein, a higher-resolution region within the field of view of a LiDAR includes any region where a higher resolution occurs than in another area of the field of view. A LiDAR can be a scanning LiDAR or a non-scanning LiDAR (e.g., a flash LiDAR), to name just some examples. A scanning LiDAR can operate based on mechanical scanning (e.g., as exemplified in FIG. 3A herein) or non-mechanical scanning. A non-mechanically scanning LiDAR can operate using an optical phased array, or a tunable metasurface (e.g., including liquid crystals) with structures smaller than the wavelength of the light, to name just a few examples.

Examples herein refer to an infrared camera. As used herein, an infrared camera includes any image sensor that detects electromagnetic radiation at least within the infrared radiation range. For example, an infrared camera can register images at least within a wavelength range of about 700-14000 nanometers. For example, the output of the infrared camera can be an image where the pixel elements are coded according to the wavelength of the received radiation. In some implementations, the infrared camera can apply one or more thresholds before generating an output, including, by not limited to, that output is only generated if wavelengths below a specific limit is detected (e.g., which could signify a person, animal, or vehicle, which may have greater temperature than other surroundings). For example, the output of the infrared camera can be the coordinates (e.g., x,y-coordinates) where the infrared camera detected radiation satisfying the threshold(s).

Examples herein refer to an event-based sensor. As used herein, an event-based sensor includes any image sensor that registers at least local changes in brightness over time. The event-based sensor can output events (e.g., a continuous stream of events) corresponding to detection (e.g., by a pixel) of a change in light intensity. In some implementations, the event-based sensor can apply one or more thresholds before generating an output, including, by not limited to, that output is only generated if a sufficiently large change in brightness is detected (e.g., which could signify a person, animal, or vehicle in motion). For example, the output of the event-based sensor can be the coordinates (e.g., x,y-coordinates) where the event-based sensor detected radiation satisfying the threshold(s).

FIG. 1 shows an example of a system 100. The system 100 can be used with one or more other examples described elsewhere herein. The system 100 can be implemented using some or all components described with reference to FIG. 9 below.

The system 100 in part includes an infrared camera 102, an event-based sensor 104, at least one sensor 106, and a LiDAR 108. Examples described in the following illustrate ways of configuring the resolution of the LiDAR 108. More or fewer components than shown can be used.

The system 100 includes a perception component 110 that receives sensor data and performs object detection and tracking to help the system 100 plan how to control an ego vehicle's behavior. In a first implementation of the system 100 described in the following, the perception component 110 can be entirely bypassed when controlling the resolution configuration of the LiDAR 108. In such scenarios, the LiDAR 108 can configure its resolution without using any aspect of the perception component 110. Later will be described a second implementation of the system 100 in which the perception component 110 can be partially bypassed.

The following relates to both the first and second implementations of the system 100. The perception component 110 includes a component 112. For example, the component 112 can be configured to perform detection of objects (e.g., to distinguish the object from a road surface or other background). As another example, the component 112 can be configured to perform classification of objects (e.g., whether the object is a vehicle or a human). As another example, the component 112 can be configured to perform segmentation (e.g., to associate raw detection points into a coherent assembly to reflect the shape and pose of an object).

The perception component 110 can include a localization component 114. In some implementations, the localization component 114 serves to estimate the position of the ego vehicle substantially in real time. For example, the localization component 114 can use one or more sensor outputs, including, but not limited to, a global positioning system and/or a global navigation satellite system.

The perception component 110 can include a sensor fusion component 116. The sensor fusion component 116 can fuse the output from two or more sensors in order to facilitate the operations of the perception component 110. In some implementations, one or more of such outputs can be generated by the infrared camera 102, the event-based sensor 104, the sensor 106, and/or the LiDAR 108. For example, this can facilitate that the perception component 110 can take into account both output from the LiDAR 108 indicating that an object such as (e.g., in FIG. 2) a vehicle 206, bicycle 208, and/or pedestrian 210 may interfere with the intended motion trajectory of the ego vehicle, as well as other sensor output (e.g., from a radar or ultrasonic sensor) indicating a distance to the object.

The perception component 110 can include a tracking component 118. In some implementations, the tracking component 118 can track objects in the surroundings of the ego vehicle for purposes of planning vehicle motion. For example, one or more of the vehicle 206, bicycle 208, and/or pedestrian 210 can be tracked in successive instances of sensor data processed by the perception component 110.

Figure 2:
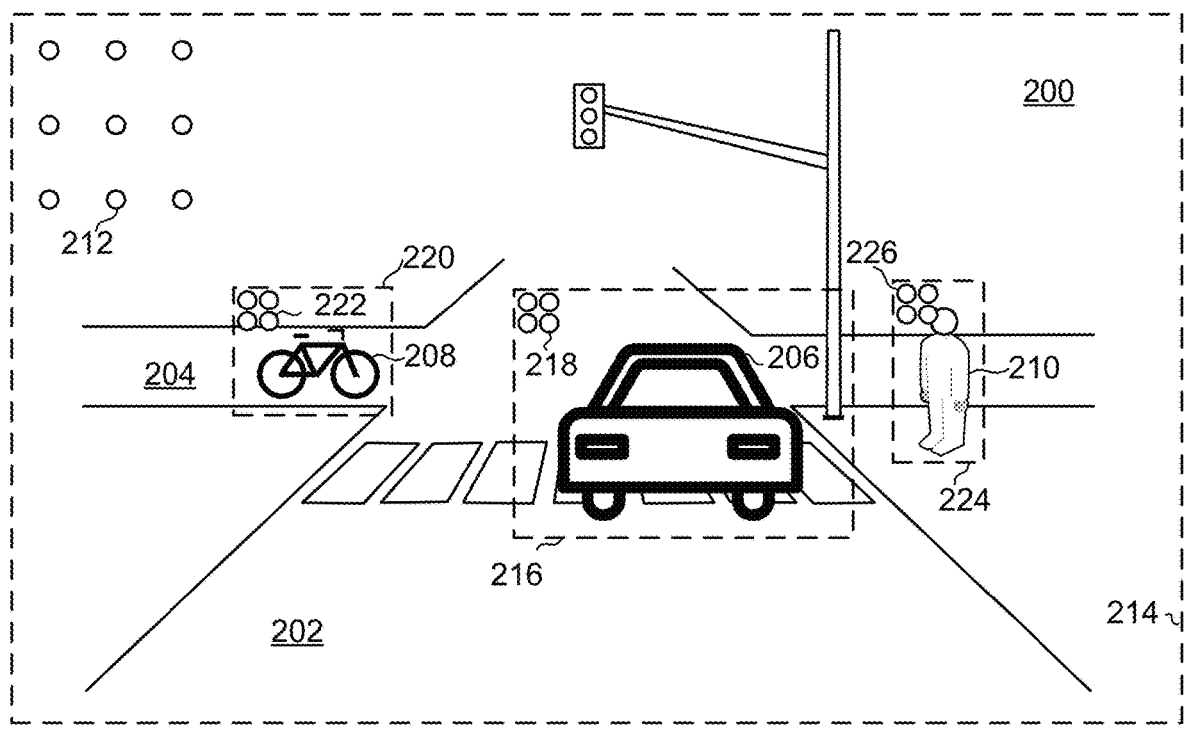
FIG. 2 shows an example of a representation of surroundings of a vehicle.

The following description relates to the first implementation of the system 100 where the perception component 110 can be entirely bypassed when controlling the resolution configuration of the LiDAR 108. The infrared camera 102 can generate output 120 for the LiDAR 108. The event-based sensor 104 can generate output 122 for the LiDAR 108. The output 120 and/or 122 bypasses the perception component 110. If and to the extent the output 120 and/or 122 needs to be processed (e.g., by coordinate transformation), this can be performed by the LiDAR 108 or by a separate component (not shown). In some implementations, receiving the output 120 and/or 122 can allow the LiDAR 108 to more quickly change the resolution it applies in generating a representation 200 (FIG. 2). That is, in the first implementation the LiDAR 108 controls its resolution configuration without using any aspect of the perception component 110. With reference briefly to FIG. 2, the output 120 and/or 122 can allow the LiDAR 108 to apply a frame 216, 220, and/or 224 without having to process the information through the perception component 110. For example, the LiDAR 108 can increase the resolution at a detected object (e.g., the vehicle 206, bicycle 208, and/or pedestrian 210) faster because the control operation does not pass through the perception component 110.

The system 100 includes a motion planning component 124. The motion planning component 124 can plan for the system 100 to perform one or more actions, or to not perform any action, in response to monitoring of the surroundings of the ego vehicle and/or an input by the driver. The output of one or more of the sensors as processed by the perception component 110 can be taken into account. The motion planning component 124 includes a prediction component 126. For example, the prediction component 126 uses the output of the perception component 110 (e.g., a tracked object) to make a prediction or estimation of likely future motion of the tracked object, and how this relates to current or planned motion of the ego vehicle. The motion planning component 124 includes a trajectory construction component 128. For example, the trajectory construction component 128 takes the prediction(s) generated by the prediction component 126, optionally together with information about the tracked object(s) from the perception component 110, and prepares a trajectory path for the ego vehicle.

The system 100 includes a vehicle actuation component 130. The vehicle actuation component 130 can control one or more aspects of the ego vehicle according to the path generated by the trajectory construction component 128. For example, the steering, gear selection, acceleration, and/or braking of the ego vehicle can be controlled.

That is, in the first implementation of the system 100, the LiDAR 108 can control its resolution configuration based on the infrared camera 102 and/or the event-based sensor 104 without invoking the perception component 110. Rather, the perception component 110 can then be used by the system 100 for processing the LiDAR output of the LiDAR 108 as a basis for the motion planning and control of the vehicle.

The following description relates to the second implementation of the system 100 where the perception component 110 can be partially bypassed in order to control the resolution configuration of the LiDAR 108. In such scenarios where there is a partial bypass of the perception component 110, the system 100 can use the perception component 110 for relatively simple and quick operations that serve as a basis for the LiDAR 108 to control its resolution configuration. In some implementations, the perception component 110 includes a transformation component 132. For example, the transformation component 132 can be implemented as a relatively simple program running on the computing hardware.

The transformation component 132 can receive sensor output from the infrared camera 102, and/or sensor output from the event-based sensor 104, and can perform transformations of coordinates (e.g., by mapping) of the sensor output so that they can be used by the LiDAR 108. Accordingly, the transformation component 132 can generate an output 134 for receipt by the LiDAR 108. The output 134 is generated without invoking other aspects of the perception stack. For example, generating the output 134 does not involve use of the component 112, the localization component 114, the sensor fusion component 116, or the tracking component 118. The use of the transformation component 132 to generate the output 134, with a bypass of the remainder of the perception component 110, can be considered a fast-track approach to allow the LiDAR 108 to quickly configure its resolution.

The LiDAR 108 can use the output 134 to configure its resolution (e.g., to adjust one or more higher-resolution regions within its field of view). After the LiDAR 108 configures its resolution and generates LiDAR output, the system 100 can use a remainder of the perception component 110 for the processing of the LiDAR output. For example, this remainder of the perception component 110 can operate as described above with regard to the first implementation of the system 100.

In implementations that completely bypass the perception component 110 (e.g., the first implementation of the system 100 mentioned above), the transformation component 132 can be used in the perception processing, or can be omitted.

FIG. 2 shows an example of the representation 200 of surroundings of a vehicle. The representation 200 can be used with one or more other examples described elsewhere herein. In some implementations, the representation 200 can be generated in an AD system (e.g., by a LiDAR) as part of assisting the driving of the vehicle. The vehicle with the AD system is here not visible in the representation 200 and will be referred to as the "ego vehicle".

The representation 200 indicates at least part of the surroundings of the ego vehicle. For example, part of the surroundings can be in a field of view of a LiDAR at any given moment. Such surroundings here include, but are not limited to, streets 202 and 204 that meet in an intersection having a stoplight and at least one crosswalk. Aspects of the surroundings that have been detected can be included in the representation 200. Here, the vehicle 206 is shown to schematically indicate that the AD system has detected another vehicle. For example, the vehicle 206 can be positioned ahead of the ego vehicle on the street 202. Here, the bicycle 208 is shown to schematically indicate that the AD system has detected a bicycle. For example, the bicycle 208 can be positioned on the street 204 and traveling toward the intersection. Here, the pedestrian 210 is shown to schematically indicate that the AD system has detected a person. For example, the pedestrian 210 can be positioned near the intersection of the streets 202 and 204.

The LiDAR can operate with one or more levels of image resolution. Generally, at a greater resolution of the LiDAR, relatively more details of the surroundings are included in the representation 200. Conversely, at a lower resolution of the LiDAR, relatively fewer details of the surroundings are included in the representation 200. The LiDAR can operate by emitting light pulses (e.g., laser pulses within a wavelength range) and detecting the reflections from them. A standard or default mode of operation of the LiDAR and/or the AD system can be to use a first level of resolution. A grid 212 is here schematically shown as being applied within a frame 214 (e.g., a field of view of the LiDAR), and involves using the first level of resolution in generating the representation 200. The grid 212 extends throughout the entirety of the frame 214 but is shown only in a part of the frame 214 for clarity. The frame 214 includes the portions of the representation 200 that are visible in this example.

A different resolution can be applied in one or more aspects of the representation 200. Here, the frame 216 is applied to the vehicle 206. A grid 218 is here schematically shown as being applied within the frame 216, and involves using a second level of resolution to the vehicle 206 in generating the representation 200. The grid 218 extends throughout the entirety of the frame 216 but is shown only in a part of the frame 216 for clarity. For example, the second resolution can be greater than the first resolution.

Here, the frame 220 is applied to the bicycle 208. A grid 222 is here schematically shown as being applied within the frame 220, and involves using a third level of resolution to the bicycle 208 in generating the representation 200. The grid 222 extends throughout the entirety of the frame 220 but is shown only in a part of the frame 220 for clarity. In some implementations, the third resolution can be greater than the first resolution. For example, the second and third resolutions can be substantially equal to each other.

Here, the frame 224 is applied to the pedestrian 210. A grid 226 is here schematically shown as being applied within the frame 224, and involves using a fourth level of resolution to the pedestrian 210 in generating the representation 200. The grid 226 extends throughout the entirety of the frame 224 but is shown only in a part of the frame 224 for clarity. In some implementations, the fourth resolution can be greater than the first resolution. For example, the second, third, and fourth resolutions can be substantially equal to each other.

Figure 3A:
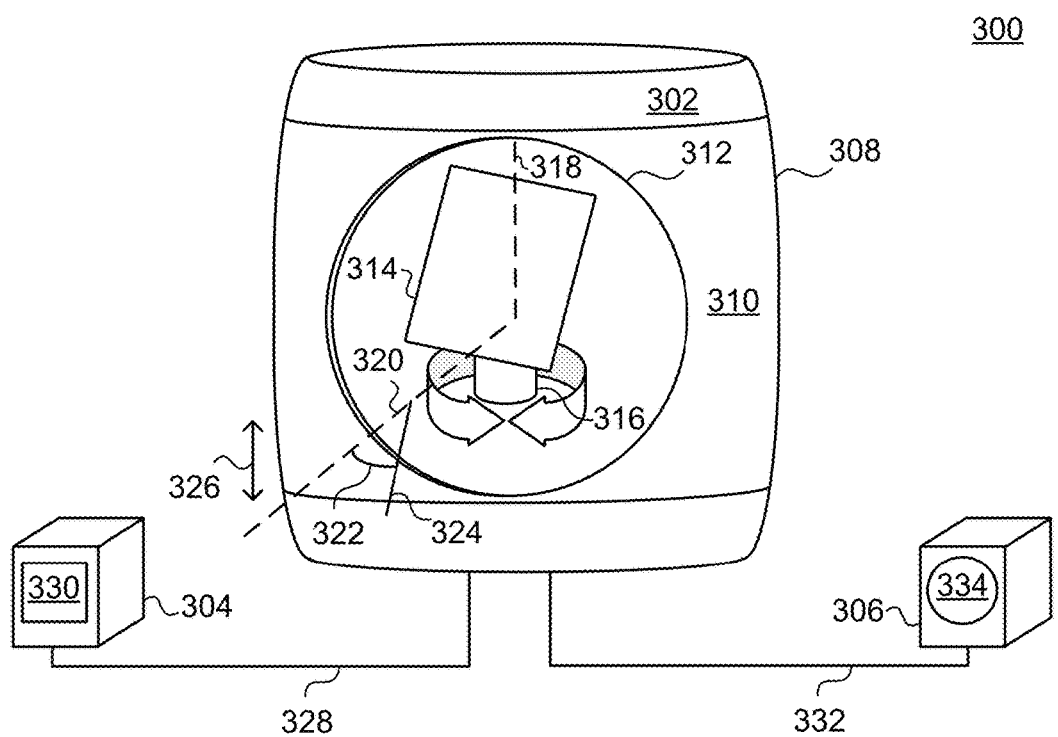
FIG. 3A shows an example of a system including a scanning LiDAR, an infrared camera and an event-based sensor.

FIG. 3A shows an example of a system 300 including a scanning LiDAR 302, an infrared camera 304 and an event-based sensor 306. The system 300 can be used with one or more other examples described elsewhere herein. The system 300 can be implemented using some or all components described with reference to FIG. 9 below.

The scanning LiDAR 302 can be implemented as one or more physical devices operating together. Here, the scanning LiDAR 302 is included substantially within a housing 308. The housing 308 can be transparent to one or more types of electromagnetic radiation in at least some areas. For example, the housing 308 can include a window 310 extending across at least part of the periphery of the housing 308. The housing 308 can be a common housing for at least two of the components of the system 300. For example, the scanning LiDAR 302 and one or more of the infrared camera 304 or the event-based sensor 306 can be located within the housing 308.

Here, a cutout 312 in the housing 308 is used to show part of the inside of the scanning LiDAR 302. The scanning LiDAR 302 includes a reflector 314 within the housing 308. The reflector 314 can include one or more materials that substantially reflects at least the type of electromagnetic radiation used by the scanning LiDAR 302 (e.g., transparent glass with a reflective coating). The reflector 314 can be moveable in one or more directions. In some implementations, the reflector 314 can be rotated so as to be oriented in different substantially horizontal directions. For example, the reflector 314 can be mounted on a vertical axle 316 that can rotate in either or both directions. The orientation of the reflector 314 can be controlled by one or more motors or other actuators (not shown).

Operation of the scanning LiDAR 302 can involve light 318 that is here schematically illustrated as a dashed line oriented substantially vertically with one end at the reflector 314, and light 320 that is here schematically illustrated as a dashed line oriented substantially horizontally with one end at the reflector 314. The lights 318-320 can illustrate emission of light (e.g., laser pulses) by the scanning LiDAR 302, or reception of reflected light (e.g., from the laser pulses) by the scanning LiDAR 302, or both. For example, a light source (not shown) of the scanning LiDAR 302 can generate a beam of laser light that propagates to the reflector 314 as the light 318, and is there reflected as the light 320 and continues to travel away from the scanning LiDAR 302. As another example, light can travel toward the reflector 314 as the light 320, and there be reflected as the light 318 and continue to travel toward an image sensor (not shown) of the scanning LiDAR 302. Other approaches can be used.

As mentioned, the reflector 314 can be used to change the orientation of the light 320 in the outgoing direction. The orientation can be defined in any of multiple ways. In some implementations, the light 320 can be characterized at any time by way of an angle 322 that the light 320 forms with regard to a reference direction 324 that can be chosen to be in an arbitrary direction. For example, when the reflector 314 is caused to rotate, the angle 322 (e.g., an azimuthal angle) can continuously vary relative to the reference direction 324. In some implementations, the light 320 in the outgoing direction can be characterized at any time by way of an elevation 326 with regard to an arbitrary level or plane. For example, laser pulses can be generated that have different values of the elevation 326 so as to provide scanning in more than one dimension.

The infrared camera 304 can generate one or more outputs that can be taken into account by the scanning LiDAR 302. The output(s) can be provided by way of a connection 328 between the infrared camera 304 and the scanning LiDAR 302. The connection 328 can be a wired connection or a wireless connection.

With reference again also to FIG. 2, the infrared camera 304 can detect whether any portion of the surroundings of the ego vehicle has a different temperature than any other portion of the surroundings. In some implementations, the infrared camera 304 can select a portion of the surroundings to be indicated by its output based on the portion of the surroundings having a greater temperature than the other portion of the surroundings. For example, the infrared camera 304 can detect the vehicle 206 based on receiving electromagnetic radiation from it that indicates a greater temperature than in its vicinity (e.g., based on a drive train and/or exhaust component). As another example, the infrared camera 304 can detect the bicycle 208 based on receiving electromagnetic radiation that indicates a greater temperature than in its vicinity (e.g., based on the rider's body temperature). As another example, the infrared camera 304 can detect the pedestrian 210 based on receiving electromagnetic radiation from him or her that indicates a greater temperature than in the vicinity. As such, the infrared camera 304 can detect these and/or other features and can make an output to the scanning LiDAR 302 indicating the presence and location of such feature(s). The infrared camera 304 can use at least one thermal sensor 330 in making the detection(s).

The event-based sensor 306 can generate one or more outputs that can be taken into account by the scanning LiDAR 302. The output(s) can be provided by way of a connection 332 between the event-based sensor 306 and the scanning LiDAR 302. The connection 332 can be a wired connection or a wireless connection. With reference again also to FIG. 2, the event-based sensor 306 can detect whether any portion of the surroundings of the ego vehicle has a different pixel change than any other portion of the surroundings. In some implementations, the event-based sensor 306 can select a portion of the surroundings to be indicated by its output based on the portion of the surroundings having greater pixel change than the other portion of the surroundings. For example, the event-based sensor 306 can detect the vehicle 206 based on detecting a change in brightness of pixels in the captured image, such brightness change indicating that the vehicle 206 is moving relative to the street 202 and/or 204. As another example, the event-based sensor 306 can detect the bicycle 208 based on detecting a brightness change indicating that the bicycle 208 is moving relative to the street 202 and/or 204. As another example, the event-based sensor 306 can detect the pedestrian 210 based on detecting a brightness change indicating that the pedestrian 210 is moving relative to the street 202 and/or 204. As such, the event-based sensor 306 can detect these and/or other features and can make an output to the scanning LiDAR 302 indicating the presence and location of such feature(s). The event-based sensor 306 can use at least one camera 334 in making the detection(s).

The scanning LiDAR 302 can receive the output generated by the infrared camera 304 and/or the event-based sensor 306 and can use the output(s) for one or more purposes. In some implementations, the scanning LiDAR 302 can control its resolution in generating the representation 200 (FIG. 2) based on the output(s). For example, a higher resolution can be applied within the frame 216, 220, and/or 224 in response to receiving the output(s). Each of the frames 216, 220, and 224 can be referred to as a higher-resolution region when the scanning LiDAR 302 applies a greater resolution in that area compared to some other portion of the surroundings of the ego vehicle. In some implementations, the scanning LiDAR 302 can adjust a scanning rate to control the level of resolution. For example, the rotational speed of the reflector 314 can be reduced to facilitate more laser pulses being generated per unit of time or per units of the angle 322. In some implementations, the scanning LiDAR 302 can adjust a laser pulse frequency to control the level of resolution. For example, more laser pulses per unit time can be generated in at least one particular direction to increase the resolution.

The system 300 is an example of a system that comprises a first sensor to generate a first output (e.g., at the connection 328 or 332), the first sensor comprising at least one of an infrared camera (e.g., the infrared camera 304) or an event-based sensor (e.g., the event-based sensor 306). The first output indicates a portion of surroundings of the system. In some implementations, the first output can indicate any or all of the frames 216, 220, and/or 224. The system includes a LiDAR (e.g., the scanning LiDAR 302) having a field of view. The LiDAR receives the first output generated by the first sensor and controls the field of view based at least in part on the first output. Proper calibration among the sensors and the LiDAR, and coordinate transformation, can be performed to ensure that the outputs of the infrared or event cameras are correctly mapped into the LiDAR field of view.

The system 300 can be included in an AD system of the ego vehicle. The AD system can be configured to perform one or more operations to assist the driving of the ego vehicle. In some implementations, the AD system can be configured for performing motion control of the ego vehicle. In so doing, the AD system can make use of a perception component that receives sensor data and performs object detection and tracking to help the AD system plan how to control the ego vehicle's behavior. For example, the perception component can be configured to perform detection of one or more objects (e.g., the vehicle 206, bicycle 208, and/or pedestrian 210), perform fusion of two or more sensor outputs (e.g., from the infrared camera 304, and/or the event-based sensor 306, and/or other sensor(s)), and to perform tracking of one or more objects (e.g., the movement of the vehicle 206, bicycle 208, and/or pedestrian 210 over time). Here, the first output (e.g., from the infrared camera 304 and/or the event-based sensor 306), bypasses the perception component. In some implementations, this can allow the scanning LiDAR 302 to more quickly change the resolution it applies in generating the representation 200 (FIG. 2). For example, the scanning LiDAR 302 can increase the resolution at a detected object faster because the control operation does not pass through the perception component.

Figure 3B:
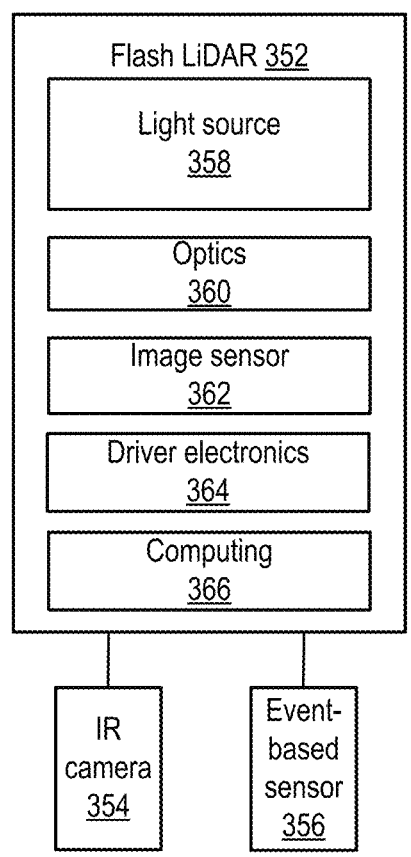
FIG. 3B shows an example of a system including a flash LiDAR, an infrared camera and an event-based sensor.

FIG. 3B shows an example of a system 350 including a flash LiDAR 352, an infrared camera 354, and an event-based sensor 356. The system 350 can be used with one or more other examples described elsewhere herein. The system 350 can be implemented using some or all components described with reference to FIG. 9 below.

The flash LiDAR 352 can be implemented as one or more physical devices operating together. Here, the flash LiDAR 352 includes at least one light source 358, optics 360, at least one image sensor 362, driver electronics 364, and a computing component 366. Other components can be used additionally or alternatively.

In operation of the system 350, the light source 358 (which includes, e.g., a laser or a light-emitting diode) generates a flash of light which the optics 360 (e.g., one or more lenses and/or any other optical substrate) directs toward at least part of the surroundings of the system 350. The image sensor 362 (which includes, e.g., a charge-coupled device or a complementary metal-oxide-semiconductor sensor) detects at least some of the emitted light that has been reflected by the surroundings. The driver electronics 364 (which includes, e.g., a chip or other integrated circuit) controls and synchronizes the operation of at least the light source 358 and the image sensor 362. The computing component 366 (which includes, e.g., one or more processors executing instructions) performs calculations to determine one or more characteristics of the surroundings of the system 350.

The infrared camera 354 can generate one or more outputs that can be taken into account by the flash LiDAR 352. With reference again also to FIG. 2, the infrared camera 354 can detect whether any portion of the surroundings of the ego vehicle has a different temperature than any other portion of the surroundings. In some implementations, the infrared camera 354 can select a portion of the surroundings to be indicated by its output based on the portion of the surroundings having a greater temperature than the other portion of the surroundings. For example, the infrared camera 354 can detect the vehicle 206 based on receiving electromagnetic radiation from it that indicates a greater temperature than in its vicinity (e.g., based on a drive train and/or exhaust component). As another example, the infrared camera 354 can detect the bicycle 208 based on receiving electromagnetic radiation that indicates a greater temperature than in its vicinity (e.g., based on the rider's body temperature). As another example, the infrared camera 354 can detect the pedestrian 210 based on receiving electromagnetic radiation from him or her that indicates a greater temperature than in the vicinity. As such, the infrared camera 354 can detect these and/or other features and can make an output to the flash LiDAR 352 indicating the presence and location of such feature(s). The infrared camera 354 can use at least one thermal sensor in making the detection(s).

The event-based sensor 356 can generate one or more outputs that can be taken into account by the flash LiDAR 352. With reference again also to FIG. 2, the event-based sensor 356 can detect whether any portion of the surroundings of the ego vehicle has a different pixel change than any other portion of the surroundings. In some implementations, the event-based sensor 356 can select a portion of the surroundings to be indicated by its output based on the portion of the surroundings having greater pixel change than the other portion of the surroundings. For example, the event-based sensor 356 can detect the vehicle 206 based on detecting a change in brightness of pixels in the captured image, such brightness change indicating that the vehicle 206 is moving relative to the street 202 and/or 204. As another example, the event-based sensor 356 can detect the bicycle 208 based on detecting a brightness change indicating that the bicycle 208 is moving relative to the street 202 and/or 204. As another example, the event-based sensor 356 can detect the pedestrian 210 based on detecting a brightness change indicating that the pedestrian 210 is moving relative to the street 202 and/or 204. As such, the event-based sensor 356 can detect these and/or other features and can make an output to the flash LiDAR 352 indicating the presence and location of such feature(s). The event-based sensor 356 can use at least one camera in making the detection(s).

The flash LiDAR 352 can receive the output generated by the infrared camera 354 and/or the event-based sensor 356 and can use the output(s) for one or more purposes. The flash LiDAR 352 can control its resolution in generating the representation 200 (FIG. 2) based on the output(s). In some implementations, a higher resolution can be applied within the frame 216, 220, and/or 224 in response to receiving the output(s). Each of the frames 216, 220, and 224 can be referred to as a higher-resolution region when the flash LiDAR 352 applies a greater resolution in that area compared to some other portion of the surroundings of the ego vehicle. For example, the light source 358 and/or the optics 360 can be controlled such that the generated flash of light has more concentrated light rays in the higher-resolution area(s) than in another region.

Two or more of the components of the system 350 can be located with a common housing. For example, the flash LiDAR 352 and one or more of the infrared camera 354 or the event-based sensor 356 can be located within the common housing.

The system 350 is an example of a system that comprises a first sensor to generate a first output, the first sensor comprising at least one of an infrared camera (e.g., the infrared camera 354) or an event-based sensor (e.g., the event-based sensor 356). The first output indicates a portion of surroundings of the system. In some implementations, the first output can indicate any or all of the frames 216, 220, and/or 224. The system includes a LiDAR (e.g., the flash LiDAR 352) having a field of view. The LiDAR receives the first output generated by the first sensor and controls the field of view based at least in part on the first output.

FIG. 3C shows another example of a flash LiDAR 370. The flash LiDAR 370 can be used with one or more other examples described elsewhere herein. For example, the flash LiDAR 370 can include some or all of the components described with reference to the flash LiDAR 352 (FIG. 3B). The flash LiDAR 370 is here schematically shown in a top view. The flash LiDAR 370 can include one or more transmitter units and one or more receiver units. For example, a transmitter unit can include at least one light source, and a receiver unit can include at least one image sensor. The transmitter units and the receiver units can be separate from each other or can be implemented as integrated transmitter/receiver (Tx/Rx) units. Here, the flash LiDAR 370 includes Tx/Rx units 372A, 372B, and 372C. The Tx/Rx units 372A-372C can include the same or different components compared to each other. For example, each of the Tx/Rx units 372A-372C can include at least a light source and an image sensor. Some components can be common to two or more of the Tx/Rx units 372A-372C. For example, the LiDAR 370 can include driver electronics and/or a computing component for the Tx/Rx units 372A-372C.

Here, the Tx/Rx units 372A-372C are positioned horizontally side by side with each other. Other arrangements can be used. The design of the flash LiDAR 370 can take into account a tradeoff between field of view and range. For example, a relatively wide (narrow) field of view is associated with a relatively shorter (longer) range. In some implementations, some or all of the Tx/Rx units 372A-372C can be configured differently from each other in order to facilitate a greater selection of fields of view and/or ranges for the flash LiDAR 370. Stated somewhat differently, the Tx/Rx unit 372A can have less resolution than the Tx/Rx unit 372B; the Tx/Rx unit 372B, moreover, can have less resolution than the Tx/Rx unit 372C.

As such, each of the Tx/Rx units 372A-372C covers a different combination of field of view and range. Fields of view are here schematically illustrated as isosceles triangles with their bases oriented vertically relative to the viewer. For example, the bases of the triangles here indicate the respective widths of the fields of view in a horizontal direction, and the heights of the triangles from their bases here indicate the respective ranges from the flash LiDAR 370. The Tx/Rx unit 372A here has a field of view 374A, the Tx/Rx unit 372B here has a field of view 374B, and the Tx/Rx unit 372C here has a field of view 374C. The field of view 374A is wider than, and has a shorter range than, the field of view 374B. The field of view 374B is wider than, and has a shorter range than, the field of view 374C. The flash LiDAR 370 can be said to have a field of view that is based on some or all of the fields of view 374A-374C.

In some implementations, the flash LiDAR 370 can include a single Tx/Rx unit to provide the functionality of the Tx/Rx units 372A-372C (or other combinations). In such examples, the flash LiDAR 370 can sequentially switch through the configurations corresponding to the respective fields of view and ranges of the multiple Tx/Rx units in a time-division multiplexing manner. For example, the flash LiDAR 370 can then operate using a frame rate that is about three times the rate of any of the Tx/Rx units 372A-372C.

In some implementations, at least two units can be used for the flash LiDAR 370. For example, one unit can correspond to the Tx/Rx units 372A-372B, and another unit can correspond to the Tx/Rx unit 372C.

One or more of the Tx/Rx units 372A-372C can be moveable in at least one direction. In some implementations, a Tx/Rx unit having relatively greater resolution than at least one other Tx/Rx unit can be moveable. The Tx/Rx unit(s) can be moveable horizontally and/or vertically, to name just a few examples. In some implementations, the Tx/Rx unit(s) can be rotated about one or more rotation axes. Here, the flash LiDAR 370 includes a rotation mechanism 376. In some implementations, the rotation mechanism 376 is applied to at least the Tx/Rx unit 372C. The rotation mechanism 376 can be actuated to rotate the Tx/Rx unit 372C about a vertical rotation axis. For example, an arrow 378 schematically illustrates rotation of the field of view 374C corresponding to the rotation of the Tx/Rx unit 372C. The rotation mechanism 376 can include one or more rotary actuator. For example, the rotation mechanism 376 can include at least one axle to which the Tx/Rx unit 372C can be mounted, and at least one actuator (e.g., an electric motor) configured to rotate the axle relative to the flash LiDAR 370.

The movement of at least one of the Tx/Rx units 372A-372C can be based on one or more inputs. In some implementations, the Tx/Rx unit 372C can be rotated by the rotation mechanism 376 to configure a resolution of the flash LiDAR 370. For example, the resolution configuration can steer at least one higher-resolution region (e.g., corresponding to the field of view 374C) based on the signal(s) from an infrared camera and/or an event-based system.

In examples where the flash LiDAR 370 includes a single Tx/Rx unit to provide the functionality of the Tx/Rx units 372A-372C (or other combinations), the flash LiDAR 370 can be positioned at a moveable mount that provides orientation adjustment. In some implementations, the flash LiDAR 370 can be positioned on the rotation mechanism 376. For example, this can facilitate proper orientation for instances involving a relatively long range and narrow field of view.

Figure 4:
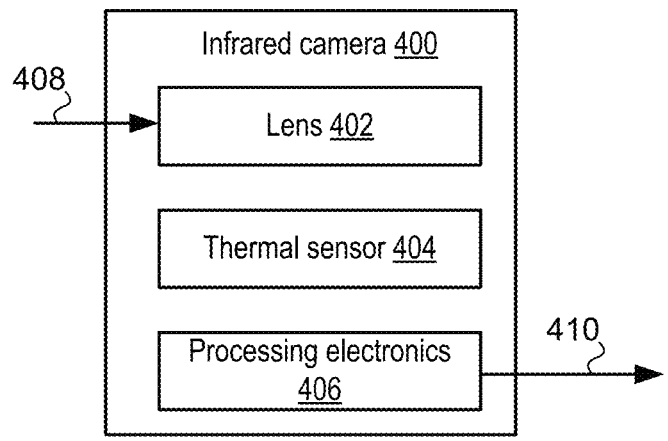
FIG. 4 shows an example of an infrared camera.

FIG. 4 shows an example of an infrared camera 400. The infrared camera 400 can be used with one or more other examples described elsewhere herein. The infrared camera 400 can be implemented using some or all components described with reference to FIG. 9 below.

The infrared camera 400 includes a lens 402, a thermal sensor 404, and processing electronics 406. Other components (not shown) can be used additionally or instead of the ones shown. The lens 402 can be included in any optics component designed to facilitate the receipt of electromagnetic radiation by the infrared camera 400 within at least an infrared range of wavelengths. The lens 402 is at least partially transmissive in the wavelength range that is to be captured and detected.

The thermal sensor 404 includes components configured to detect the infrared radiation generated by an object. In some implementations, the thermal sensor 404 includes a pyroelectric sensor. For example, multiple sensor elements of pyroelectric material can be used, and the difference in their output signals can reflect the infrared radiation being detected.

The processing electronics 406 can receive the output from the thermal sensor 404 and perform processing to facilitate the generation of a suitable output. In some implementations, the processing electronics 406 can seek to determine whether a portion of the surroundings of an ego vehicle has a different temperature (e.g., a greater temperature) than another portion of the surroundings. For example, the processing electronics 406 can apply a threshold so that the output identifies objects that are at or above a minimum temperature. The processing electronics 406 can convert the output from the thermal sensor 404 into a format suitable for a LiDAR. For example, the location of an object that has been thermally detected can be indicated by way of coordinates relative to the field of view of the LiDAR.

In short, the infrared camera 400 can receive electromagnetic radiation 408 (e.g., from the surroundings of the ego vehicle in FIG. 2). The processing electronics 406 can determine based on the radiation that the vehicle 206, bicycle 208, and/or pedestrian 210 should be identified to the LiDAR. The processing electronics 406 therefore generates an output 410 indicating that at least one of the vehicle 206, bicycle 208, and/or pedestrian 210 has a temperature different than the other surroundings.

Figure 5:
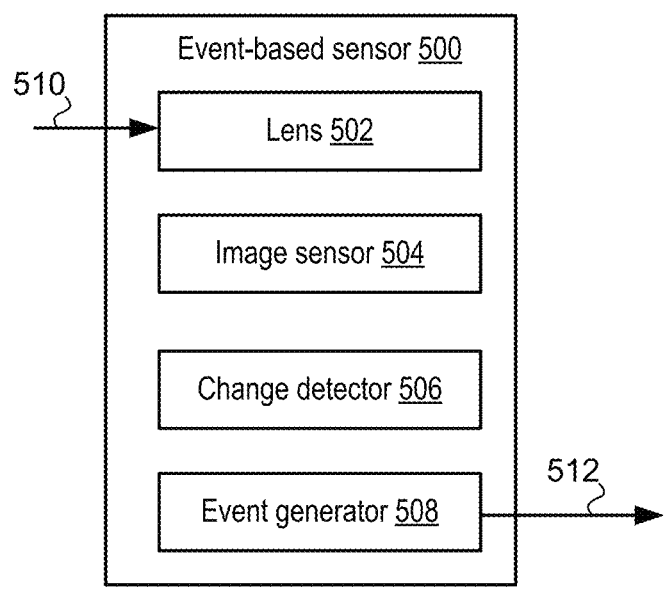
FIG. 5 shows an example of an event-based sensor.

FIG. 5 shows an example of an event-based sensor 500. The event-based sensor 500 can be used with one or more other examples described elsewhere herein. The event-based sensor 500 can be implemented using some or all components described with reference to FIG. 9 below.

The event-based sensor 500 includes a lens 502, an image sensor 504, a change detector 506, and an event generator 508. Other components (not shown) can be used additionally or instead of the ones shown. The lens 502 can be included in any optics component designed to facilitate the receipt of electromagnetic radiation by the event-based sensor 500 within at least the wavelength range of visible light. The lens 502 is at least partially transmissive in the wavelength range that is to be captured and detected.

The image sensor 504 includes components configured to detect images of objects in the surroundings. Any image sensor technology that facilitates detection of changes in brightness can be used. The image sensor 504 can be based on charge-coupled devices or complementary metal-oxide semiconductors, to name just two examples.

The change detector 506 can analyze the signals from the image sensor 504 and detect pixel-wise differences between frames. Such differences can indicate that an object within the field of view is moving relative to the event-based sensor 500. For example, if one or more of the vehicle 206, bicycle 208, and/or pedestrian 210 is in motion, the change detector 506 can detect the pixel change of the images captured by the image sensor 504. The event-based sensor 500 (e.g., implemented in an ego vehicle) may be moving during the time of capturing the frames. This motion of the image sensor 504 has the effect of causing the frames to change. The temporal resolution of the event-based sensor 500 may be sufficiently high (e.g., on the order of about 1 μs). The ego motion is therefore often negligible. If not negligible, motion compensation algorithms can be used.

The event generator 508 can receive the output from the change detector 506 and perform processing to facilitate the detection of one or more events in the surroundings of the ego vehicle. In some implementations, the event generator 508 can seek to determine whether a portion of the surroundings of an ego vehicle undergoes a different pixel change (e.g., a greater amount of motion) than another portion of the surroundings. For example, the event generator 508 can apply a threshold so that the output identifies objects undergoing at least a minimum amount of motion. The event generator 508 can generate output in a format suitable for a LiDAR. For example, the location of an object that has been spotted by way of brightness-based event detection can be indicated by way of coordinates relative to the field of view of the LiDAR.

In short, the event-based sensor 500 can receive electromagnetic radiation 510 (e.g., from the surroundings of the ego vehicle in FIG. 2). The change detector 506 and the event generator 508 can determine based on the radiation that the vehicle 206, bicycle 208, and/or pedestrian 210 should be identified to the LiDAR. The event generator 508 therefore generates an output 512 indicating that at least one of the vehicle 206, bicycle 208, and/or pedestrian 210 undergoes a different pixel change than the other surroundings.

In some implementations, the infrared camera 400 and/or the event-based sensor 500 can output coordinates regarding the surroundings that can be used directly (e.g., without transformation) by a LiDAR. For example, the infrared camera 400 and/or the event-based sensor 500 outputs coordinates indicating where to increase the resolution in a reference frame known to the LiDAR. The LiDAR can then aim the higher-resolution region(s) at the direction(s) indicated by the coordinates. In some implementations, the infrared camera 400 and/or the event-based sensor 500 can output coordinates regarding the surroundings that the LiDAR can use after performing a transformation. For example, the infrared camera 400 and/or the event-based sensor 500 outputs coordinates in a reference frame different from the one that the LiDAR uses, and the LiDAR can transform the coordinates and thereafter direct the higher-resolution region(s) toward the direction(s) indicated by the transformed coordinates.

In some implementations, the infrared camera 400 and/or the event-based sensor 500 generates an output that represents the entire scope of the surroundings detectable by the infrared camera 400 and/or the event-based sensor 500. For example, this type of output can be referred to as a "whole view" output. In such an output, one or more variables (e.g., a heat variable and/or a pixel change variable) can indicate at least one area that is of interest. Accordingly, the LiDAR that receives the output can determine the direction/location of the area of interest.

In some implementations, the infrared camera 400 and/or the event-based sensor 500 generates an output that represents only the area(s) that may be of interest. For example, this type of output can be referred to as a "hot spot" output. Such an output includes only information identifying the portion of the surroundings having a different temperature and/or pixel change, and does not identify other portions of the surroundings. Accordingly, the LiDAR that receives the output can determine the direction/location of the area of interest.

Figure 6:
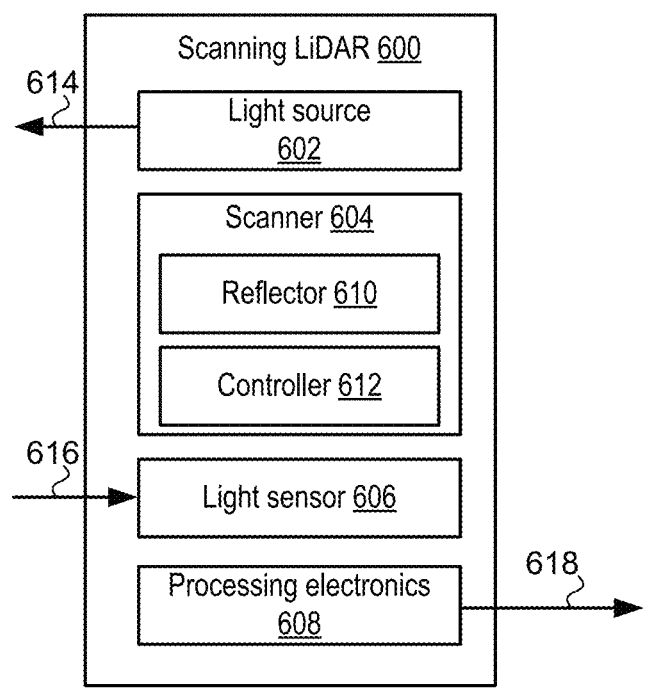
FIG. 6 shows another example of a scanning LiDAR.

FIG. 6 shows another example of a scanning LiDAR 600. The scanning LiDAR 600 can be used with one or more other examples described elsewhere herein. The scanning LiDAR 600 can be implemented using some or all components described with reference to FIG. 9 below.

The scanning LiDAR 600 includes a light source 602, a scanner 604, a light sensor 606, and processing electronics 608. The light source 602 can include one or more components to generate coherent light. For example, a laser can be used. The wavelength(s) to be generated by the laser can be selected based on the capacity of the light sensor 606, and/or on the intended surroundings and objects that the scanning LiDAR 600 should be used with.

The scanner 604 includes one or more reflector 610 and a controller 612. In some implementations, the reflector(s) 610 can be similar or identical to the reflector 314 (FIG. 3A). For example, the reflector 610 can be configured to reflect light from the light source 602 toward the surroundings of the scanning LiDAR 600, and, for light received by the scanning LiDAR 600, to reflect such light toward the light sensor 606. As another example, in a biaxial design, one instance of the reflector 610 can reflect outgoing light arriving from the light source 602, and another instance of the reflector 610 can reflect incoming light toward the light sensor 606. controller 612 can control an orientation or other position of the reflector 610. In some implementations, the controller 612 can take into account output from an infrared camera and/or an event-based sensor in determining whether to increase the resolution of the imaging performed by the scanning LiDAR 600. Rotational angle and/or rotational speed of the reflector 610 can be controlled. For example, with reference again briefly to FIG. 2, the controller 612 can facilitate that the LiDAR resolution within the frame 216 corresponds to the grid 218; that the LiDAR resolution within the frame 220 corresponds to the grid 222; and/or that the LiDAR resolution within the frame 224 corresponds to the grid 226.

The light sensor 606 includes or more elements sensitive to at least the wavelength range intended to be detected (e.g., visible light). The light sensor 606 can be based on charge-coupled devices or complementary metal-oxide semiconductors, to name just two examples.

The processing electronics 608 can receive output of the light sensor 606 and information from the controller 612 (e.g., as to the current orientation of the reflector 610) and use them in generating LiDAR output.

In short, the light source 602 can generate light 614. For example, the light 614 can be directed using the reflector 610 towards one or more portions of the surroundings of the scanning LiDAR 600. The light sensor 606 can receive light 616. For example, the light 616 can include reflections of the light 614 from some or all of the surroundings of the scanning LiDAR 600. The processing electronics 608 can generate output 618 based on the output of the light sensor 606.

Figure 7:
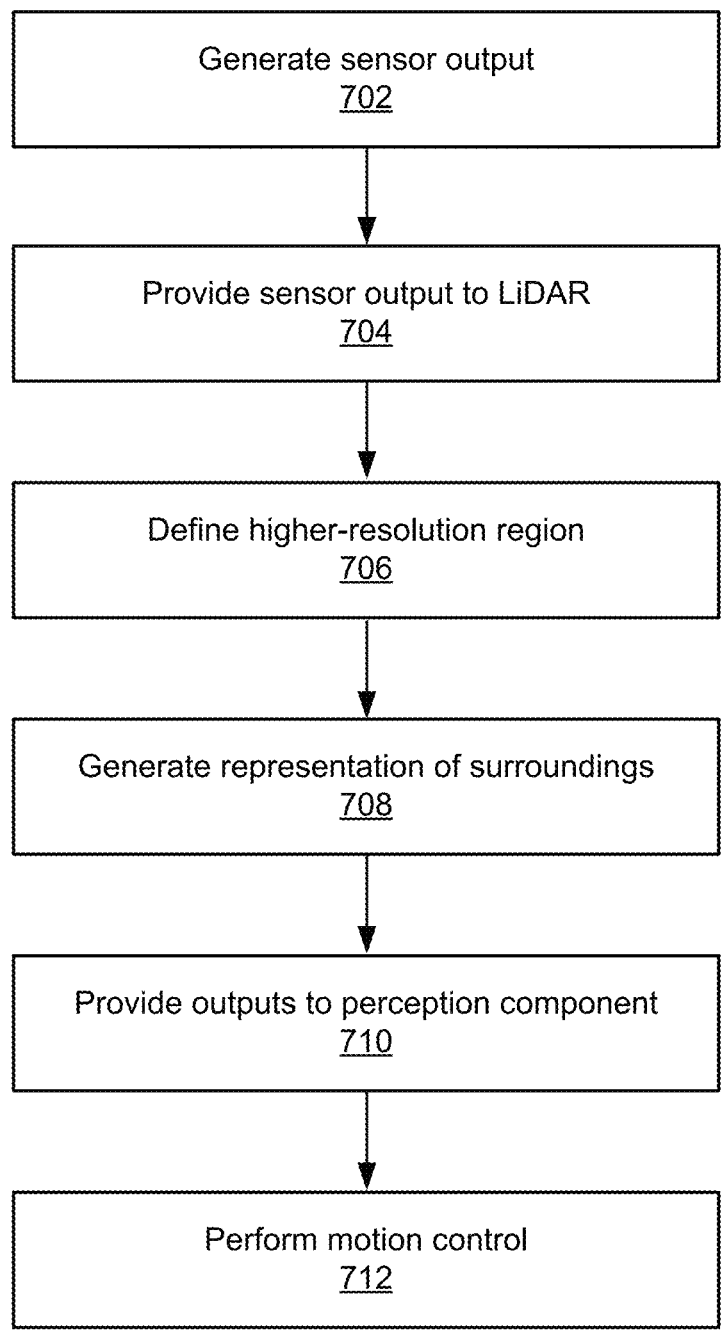
FIG. 7 shows an example of a method.

FIG. 7 shows an example of a method 700. The method 700 can be used with one or more other examples described elsewhere herein. More or fewer operations than shown can be performed. Two or more operations can be performed in a different order unless otherwise indicated.

At operation 702, the method 700 includes generating an output using a first sensor of a vehicle. For example, with reference to FIG. 3A, the first sensor can include the infrared camera 304 and/or the event-based sensor 306.

At operation 704, the method 700 includes providing the first output to a LiDAR of the vehicle. For example, with reference to FIG. 1, the output 120 and/or 122 can be provided to the LiDAR 108. As another example, the output 134 can be provided to the LiDAR 108. The LiDAR has a field of view (e.g., in FIG. 2) and is configured to operate using a higher-resolution region (e.g., the frame 216, 220, and/or 224 in FIG. 2) within the field of view. The LiDAR has a higher resolution within the higher-resolution region than elsewhere in the field of view. For example, the grid 218, 222, and/or 226 can correspond to a greater resolution than at least some other portion of the representation 200.

At operation 706, the method 700 includes defining, using the LiDAR, the higher-resolution region based on the first output. For example, the size, shape, and position of the frame 216, 220, and/or 224 in FIG. 2 can be defined. Accordingly, the LiDAR can configure its resolution by defining the higher-resolution region.

At operation 708, the method 700 includes generating a representation of the surroundings of the vehicle using the LiDAR. For example, the representation 200 (FIG. 2) can be generated. The representation includes the higher-resolution region.

At operation 710, the method 700 includes providing, to a perception component of the vehicle, second output of a second sensor of the vehicle and third output of the LiDAR. For example, with reference to FIG. 1, the output of the LiDAR 108, and at least one output of the sensor 106, the infrared camera 102, and/or the event-based sensor 104 can be provided to the perception component 110. The perception component is configured to perform object detection (e.g., by the component 112), sensor fusion (e.g., by the sensor fusion component 116), and object tracking (e.g., by the tracking component 118) regarding the second and third outputs. The first output bypasses the perception component. For example, with reference to FIG. 1, the outputs 120 and/or 122 can be provided directly to the LiDAR 108 without first passing through the perception component 110.

At operation 712, the method 700 includes performing motion control of the vehicle using a fourth output of the perception component. For example, with reference to FIG. 1, the vehicle actuation component 130 can perform motion control according to the predictions and trajectory planning performed by the motion planning component 124.

Figure 8:
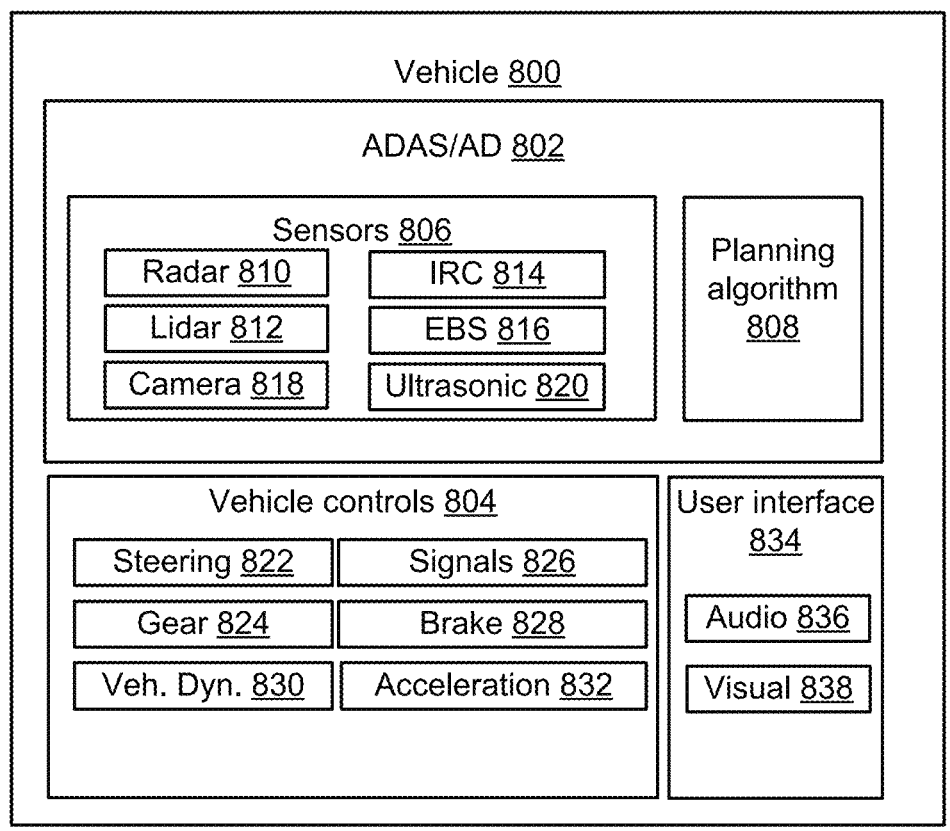
FIG. 8 shows an example of a vehicle.

FIG. 8 shows an example of a vehicle 800. The vehicle 800 can be used with one or more other examples described elsewhere herein. The vehicle 800 includes an ADAS/AD system 802 and vehicle controls 804. The ADAS/AD system 802 can be implemented using some or all components described with reference to FIG. 9 below. The ADAS/AD system 802 includes sensors 806 and a planning algorithm 808. Other aspects that the vehicle 800 may include, including, but not limited to, other components of the vehicle 800 where the ADAS/AD system 802 may be implemented, are omitted here for simplicity.

The sensors 806 are here described as also including appropriate circuitry and/or executable programming for processing sensor output and performing a detection based on the processing. The sensors 806 can include a radar 810. In some implementations, the radar 810 can include any object detection system that is based at least in part on radio waves. For example, the radar 810 can be oriented in a forward direction relative to the vehicle and can be used for detecting at least a distance to one or more other objects (e.g., another vehicle). The radar 810 can detect the surroundings of the vehicle 800 by sensing the presence of an object in relation to the vehicle 800.

The sensors 806 can include a LiDAR 812. In some implementations, the LiDAR 812 can include any object detection system that is based at least in part on laser light. For example, the LiDAR 812 can be oriented in any direction relative to the vehicle and can be used for detecting at least a distance to one or more other objects (e.g., another vehicle). The LiDAR 812 can detect the surroundings of the vehicle 800 by sensing the presence of an object in relation to the vehicle 800. In some implementations, the LiDAR 812 is a scanning LiDAR that receives output from an infrared camera 814 and/or an event-based sensor 816 to define a higher-resolution region within the field of view of the LiDAR 812. In some implementations, the LiDAR 812 is a non-scanning LiDAR (e.g., a flash LiDAR) that receives output from the infrared camera 814 and/or the event-based sensor 816 to define a higher-resolution region within the field of view of the LiDAR 812.

The sensors 806 can include a camera 818. In some implementations, the camera 818 can include any image sensor whose signal(s) the vehicle 800 takes into account. For example, the camera 818 can be oriented in any direction relative to the vehicle and can be used for detecting vehicles, lanes, lane markings, curbs, and/or road signage. The camera 818 can detect the surroundings of the vehicle 800 by visually registering a circumstance in relation to the vehicle 800.

The sensors 806 can include an ultrasonic sensor 820. In some implementations, the ultrasonic sensor 820 can include any transmitter, receiver, and/or transceiver used in detecting at least the proximity of an object based on ultrasound. For example, the ultrasonic sensor 820 can be positioned at or near an outer surface of the vehicle. The ultrasonic sensor 820 can detect the surroundings of the vehicle 800 by sensing the presence of an object in relation to the vehicle 800.

Any of the sensors 806 alone, or two or more of the sensors 806 collectively, can detect, whether or not the ADAS/AD system 802 is controlling motion of the vehicle 800, the surroundings of the vehicle 800. In some implementations, at least one of the sensors 806 can generate an output that is taken into account in providing a prompt to a driver, and/or in controlling motion of the vehicle 800. For example, the output of two or more sensors (e.g., the outputs of the radar 810, the LiDAR 812, and the camera 818) can be combined. In some implementations, one or more other types of sensors can additionally or instead be included in the sensors 806.

The planning algorithm 808 can plan for the ADAS/AD system 802 to perform one or more actions, or to not perform any action, in response to monitoring of the surroundings of the vehicle 800 and/or an input by the driver. The output of one or more of the sensors 806 can be taken into account. In some implementations, the planning algorithm 808 can perform motion planning and/or plan a trajectory for the vehicle 800.

The vehicle controls 804 can include a steering control 822. In some implementations, the ADAS/AD system 802 and/or another driver of the vehicle 800 controls the trajectory of the vehicle 800 by adjusting a steering angle of at least one wheel by way of manipulating the steering control 822. The steering control 822 can be configured for controlling the steering angle though a mechanical connection between the steering control 822 and the adjustable wheel, or can be part of a steer-by-wire system.

The vehicle controls 804 can include a gear control 824. In some implementations, the ADAS/AD system 802 and/or another driver of the vehicle 800 uses the gear control 824 to choose from among multiple operating modes of a vehicle (e.g., a Drive mode, a Neutral mode, or a Park mode). For example, the gear control 824 can be used to control an automatic transmission in the vehicle 800.

The vehicle controls 804 can include signal controls 826. In some implementations, the signal controls 826 can control one or more signals that the vehicle 800 can generate. For example, the signal controls 826 can control a turn signal and/or a horn of the vehicle 800.

The vehicle controls 804 can include brake controls 828. In some implementations, the brake controls 828 can control one or more types of braking systems designed to slow down the vehicle, stop the vehicle, and/or maintain the vehicle at a standstill when stopped. For example, the brake controls 828 can be actuated by the ADAS/AD system 802. As another example, the brake controls 828 can be actuated by the driver using a brake pedal.

The vehicle controls 804 can include a vehicle dynamic system 830. In some implementations, the vehicle dynamic system 830 can control one or more functions of the vehicle 800 in addition to, or in the absence of, or in lieu of, the driver's control. For example, when the vehicle comes to a stop on a hill, the vehicle dynamic system 830 can hold the vehicle at standstill if the driver does not activate the brake control 828 (e.g., step on the brake pedal).

The vehicle controls 804 can include an acceleration control 832. In some implementations, the acceleration control 832 can control one or more types of propulsion motor of the vehicle. For example, the acceleration control 832 can control the electric motor(s) and/or the internal-combustion motor(s) of the vehicle 800.

The vehicle 800 can include a user interface 834. The user interface 834 can include an audio interface 836. In some implementations, the audio interface 836 can include one or more speakers positioned in the passenger compartment. For example, the audio interface 836 can at least in part operate together with an infotainment system in the vehicle.

The user interface 834 can include a visual interface 838. In some implementations, the visual interface 838 can include at least one display device in the passenger compartment of the vehicle 800. For example, the visual interface 838 can include a touchscreen device and/or an instrument cluster display.

Figure 9:
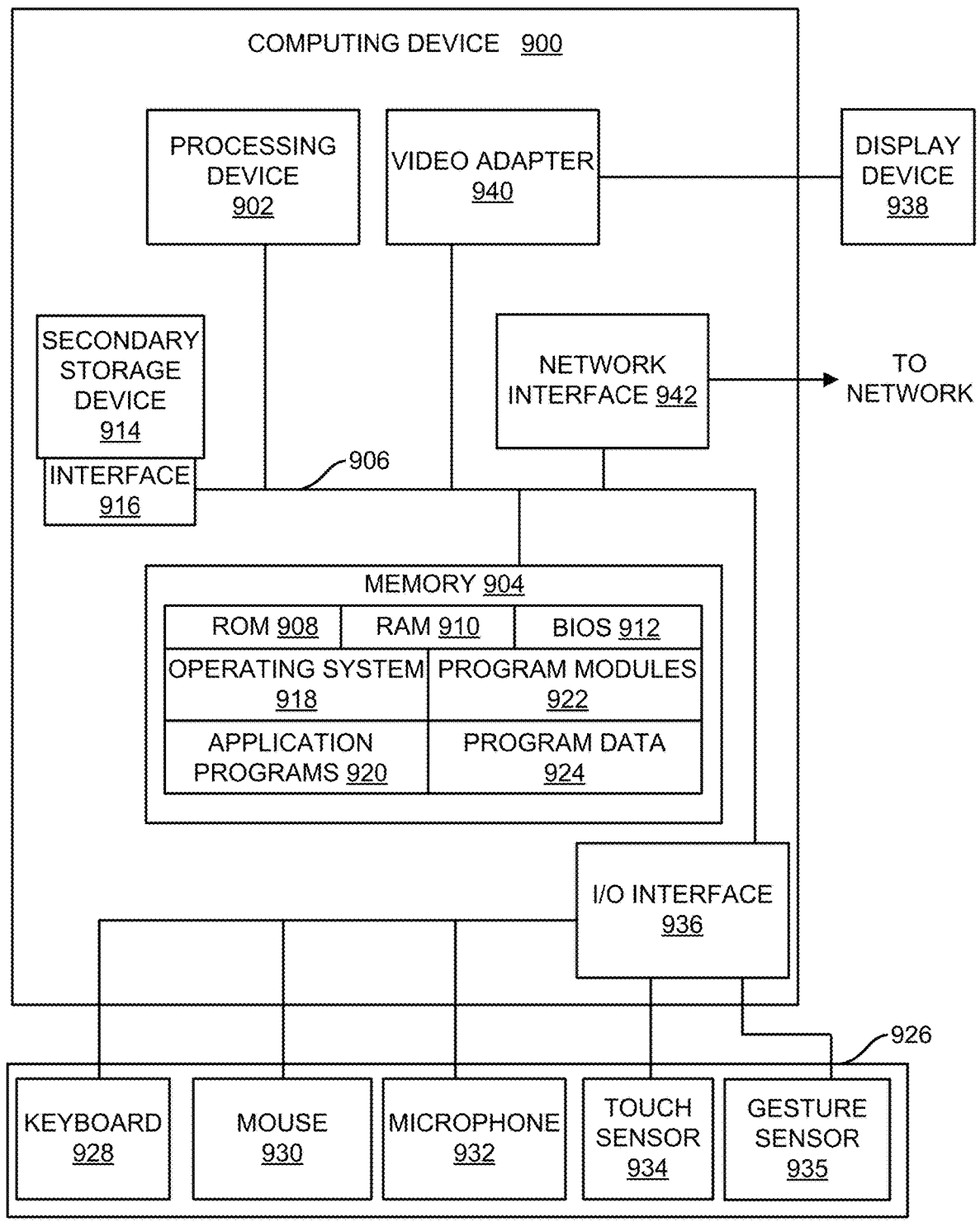
FIG. 9 illustrates an example architecture of a computing device that can be used to implement aspects of the present disclosure.

FIG. 9 illustrates an example architecture of a computing device 900 that can be used to implement aspects of the present disclosure, including any of the systems, apparatuses, and/or techniques described herein, or any other systems, apparatuses, and/or techniques that may be utilized in the various possible embodiments.

The computing device illustrated in FIG. 9 can be used to execute the operating system, application programs, and/or software modules (including the software engines) described herein.

The computing device 900 includes, in some embodiments, at least one processing device 902 (e.g., a processor), such as a central processing unit (CPU). A variety of processing devices are available from a variety of manufacturers, for example, Intel or Advanced Micro Devices. In this example, the computing device 900 also includes a system memory 904, and a system bus 906 that couples various system components including the system memory 904 to the processing device 902. The system bus 906 is one of any number of types of bus structures that can be used, including, but not limited to, a memory bus, or memory controller; a peripheral bus; and a local bus using any of a variety of bus architectures.

Examples of computing devices that can be implemented using the computing device 900 include a desktop computer, a laptop computer, a tablet computer, a mobile computing device (such as a smart phone, a touchpad mobile digital device, or other mobile devices), or other devices configured to process digital instructions.

The system memory 904 includes read only memory 908 and random access memory 910. A basic input/output system 912 containing the basic routines that act to transfer information within computing device 900, such as during start up, can be stored in the read only memory 908.

The computing device 900 also includes a secondary storage device 914 in some embodiments, such as a hard disk drive, for storing digital data. The secondary storage device 914 is connected to the system bus 906 by a secondary storage interface 916. The secondary storage device 914 and its associated computer readable media provide nonvolatile and non-transitory storage of computer readable instructions (including application programs and program modules), data structures, and other data for the computing device 900.

Although the example environment described herein employs a hard disk drive as a secondary storage device, other types of computer readable storage media are used in other embodiments. Examples of these other types of computer readable storage media include magnetic cassettes, flash memory cards, solid-state drives (SSD), digital video disks, Bernoulli cartridges, compact disc read only memories, digital versatile disk read only memories, random access memories, or read only memories. Some embodiments include non-transitory media. For example, a computer program product can be tangibly embodied in a non-transitory storage medium. Additionally, such computer readable storage media can include local storage or cloud-based storage.

A number of program modules can be stored in secondary storage device 914 and/or system memory 904, including an operating system 918, one or more application programs 920, other program modules 922 (such as the software engines described herein), and program data 924. The computing device 900 can utilize any suitable operating system.

In some embodiments, a user provides inputs to the computing device 900 through one or more input devices 926. Examples of input devices 926 include a keyboard 928, mouse 930, microphone 932 (e.g., for voice and/or other audio input), touch sensor 934 (such as a touchpad or touch sensitive display), and gesture sensor 935 (e.g., for gestural input). In some implementations, the input device(s) 926 provide detection based on presence, proximity, and/or motion. Other embodiments include other input devices 926.

The input devices can be connected to the processing device 902 through an input/output interface 936 that is coupled to the system bus 906. These input devices 926 can be connected by any number of input/output interfaces, such as a parallel port, serial port, game port, or a universal serial bus. Wireless communication between input devices 926 and the input/output interface 936 is possible as well, and includes infrared, BLUETOOTH® wireless technology, 802.11a/b/g/n, cellular, ultra-wideband (UWB), ZigBee, or other radio frequency communication systems in some possible embodiments, to name just a few examples.

In this example embodiment, a display device 938, such as a monitor, liquid crystal display device, light-emitting diode display device, projector, or touch sensitive display device, is also connected to the system bus 906 via an interface, such as a video adapter 940. In addition to the display device 938, the computing device 900 can include various other peripheral devices (not shown), such as speakers or a printer.

The computing device 900 can be connected to one or more networks through a network interface 942. The network interface 942 can provide for wired and/or wireless communication. In some implementations, the network interface 942 can include one or more antennas for transmitting and/or receiving wireless signals. When used in a local area networking environment or a wide area networking environment (such as the Internet), the network interface 942 can include an Ethernet interface. Other possible embodiments use other communication devices. For example, some embodiments of the computing device 900 include a modem for communicating across the network.

The computing device 900 can include at least some form of computer readable media. Computer readable media includes any available media that can be accessed by the computing device 900. By way of example, computer readable media include computer readable storage media and computer readable communication media.

Computer readable storage media includes volatile and nonvolatile, removable and non-removable media implemented in any device configured to store information such as computer readable instructions, data structures, program modules or other data. Computer readable storage media includes, but is not limited to, random access memory, read only memory, electrically erasable programmable read only memory, flash memory or other memory technology, compact disc read only memory, digital versatile disks or other optical storage, magnetic cassettes, magnetic tape, magnetic disk storage or other magnetic storage devices, or any other medium that can be used to store the desired information and that can be accessed by the computing device 900.

Computer readable communication media typically embodies computer readable instructions, data structures, program modules or other data in a modulated data signal such as a carrier wave or other transport mechanism and includes any information delivery media. The term "modulated data signal" refers to a signal that has one or more of its characteristics set or changed in such a manner as to encode information in the signal. By way of example, computer readable communication media includes wired media such as a wired network or direct-wired connection, and wireless media such as acoustic, radio frequency, infrared, and other wireless media. Combinations of any of the above are also included within the scope of computer readable media.

The computing device illustrated in FIG. 9 is also an example of programmable electronics, which may include one or more such computing devices, and when multiple computing devices are included, such computing devices can be coupled together with a suitable data communication network so as to collectively perform the various functions, methods, or operations disclosed herein.

In some implementations, the computing device 900 can be characterized as an ADAS computer. For example, the computing device 900 can include one or more components sometimes used for processing tasks that occur in the field of artificial intelligence (AI). The computing device 900 then includes sufficient proceeding power and necessary support architecture for the demands of ADAS or AI in general. For example, the processing device 902 can include a multicore architecture. As another example, the computing device 900 can include one or more co-processors in addition to, or as part of, the processing device 902. In some implementations, at least one hardware accelerator can be coupled to the system bus 906. For example, a graphics processing unit can be used. In some implementations, the computing device 900 can implement a neural network-specific hardware to handle one or more ADAS tasks.

The terms "substantially" and "about" used throughout this Specification are used to describe and account for small fluctuations, such as due to variations in processing. For example, they can refer to less than or equal to ±5%, such as less than or equal to ±2%, such as less than or equal to ±1%, such as less than or equal to ±0.5%, such as less than or equal to ±0.2%, such as less than or equal to ±0.1%, such as less than or equal to ±0.05%. Also, when used herein, an indefinite article such as "a" or "an" means "at least one."

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

A number of implementations have been described. Nevertheless, it will be understood that various modifications may be made without departing from the spirit and scope of the specification.

In addition, the logic flows depicted in the figures do not require the particular order shown, or sequential order, to achieve desirable results. In addition, other processes may be provided, or processes may be eliminated, from the described flows, and other components may be added to, or removed from, the described systems. Accordingly, other implementations are within the scope of the following claims.

While certain features of the described implementations have been illustrated as described herein, many modifications, substitutions, changes and equivalents will now occur to those skilled in the art. It is, therefore, to be understood that appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A computer-implemented method comprising:
generating a first output using a first sensor of a vehicle, the first sensor comprising at least one of an infrared camera or an event-based sensor, the first output indicating a portion of surroundings of the vehicle;
providing the first output to a LiDAR of the vehicle, the LiDAR having a field of view (FOV);
configuring a resolution of the LiDAR based at least in part on the first output;
generating a representation of at least part of the surroundings of the vehicle using the LiDAR;
providing, to a perception component of the vehicle, second output of a second sensor of the vehicle and third output of the LiDAR, the perception component configured to perform object detection, sensor fusion, and object tracking regarding the second and third outputs, wherein the first output bypasses at least part of the perception component; and
performing motion control of the vehicle using a fourth output of the perception component.

2. The computer-implemented method of claim 1, wherein the LiDAR is configured to operate using a higher-resolution region (HRR) within the FOV, the LiDAR having a higher resolution within the HRR than elsewhere in the FOV, and wherein configuring the resolution of the LiDAR comprises defining, using the LiDAR, a position of the HRR within the FOV based on the first output, wherein the representation includes the HRR in the FOV.

3. The computer-implemented method of claim 2, wherein defining the position of the HRR based on the first output comprises positioning the HRR at a location of the portion of the surroundings in the representation of at least part of the surroundings.

4. The computer-implemented method of claim 3, wherein the first output includes coordinates for the portion of the surroundings, and wherein the HRR is positioned using the coordinates.

5. The computer-implemented method of claim 2, wherein configuring the resolution of the LiDAR comprises adjusting a scanning rate of the LiDAR at the HRR.

6. The computer-implemented method of claim 2, wherein configuring the resolution of the LiDAR comprises adjusting a laser pulse frequency of the LiDAR at the HRR.

7. The computer-implemented method of claim 1, wherein the LiDAR is a flash LiDAR having multiple fields of view, wherein the FOV is a first FOV of the multiple fields of view, and wherein configuring the resolution of the flash LiDAR comprises steering the first FOV toward the part of the surroundings.

8. The computer-implemented method of claim 1, wherein the first sensor is the infrared camera, and wherein the first output indicates that the portion of the surroundings has a different temperature than another portion of the surroundings.

9. The computer-implemented method of claim 8, wherein the infrared camera selects the portion of the surroundings to be indicated by the first output based on the portion of the surroundings having a greater temperature than the other portion of the surroundings.

10. The computer-implemented method of claim 8, wherein the first output includes only information identifying the portion of the surroundings, and does not identify the other portion of the surroundings.

11. The computer-implemented method of claim 1, wherein the first sensor is the event-based sensor, and wherein the first output indicates a different pixel change for the portion of the surroundings than for another portion of the surroundings.

12. The computer-implemented method of claim 11, wherein the event-based sensor selects the portion of the surroundings to be indicated by the first output based on the portion of the surroundings having a greater pixel change than the other portion of the surroundings.

13. The computer-implemented method of claim 11, wherein the first output includes only information identifying the portion of the surroundings, and does not identify the other portion of the surroundings.

14. The computer-implemented method of claim 1, wherein the second sensor is at least one of the infrared camera or the event-based sensor.

15. The computer-implemented method of claim 1, wherein the second sensor is not any of the infrared camera or the event-based sensor.

16. The computer-implemented method of claim 1, wherein generating the first output further includes performing a transformation using the perception component.

17. A system comprising:
a first sensor to generate a first output, the first sensor comprising at least one of an infrared camera or an event-based sensor, the first output indicating a portion of surroundings of the system;
a LiDAR having a field of view (FOV), wherein the LiDAR receives the first output generated by the first sensor and configures a resolution of the LiDAR based at least in part on the first output; and
a perception component to receive second output of a second sensor of the system and third output of the LiDAR, the perception component to perform object detection, sensor fusion, and object tracking regarding the second and third outputs, wherein the first output bypasses at least part of the perception component.

18. The system of claim 17, wherein the LiDAR generates a representation of at least part of the surroundings.

19. The system of claim 18, wherein the LiDAR is configured to operate using a higher-resolution region (HRR) within the FOV, the LiDAR having a higher resolution within the HRR than elsewhere in the FOV, and wherein the LiDAR defines a position of the HRR within the FOV based on the first output, and wherein the representation includes the HRR in the FOV.

20. The system of claim 19, wherein the LiDAR adjusts a scanning rate of the LiDAR at the HRR.

21. The system of claim 19, wherein the LiDAR adjusts a laser pulse frequency of the LiDAR at the HRR.

22. The system of claim 19, wherein the LiDAR is a flash LiDAR having multiple fields of view, wherein the HRR corresponds to a first FOV of the multiple fields of view, and wherein the LiDAR configures the resolution by steering the HRR toward the part of the surroundings.

23. The system of claim 22, wherein the flash LiDAR includes multiple integrated transmitter/receiver (Tx/Rx) units, each of the integrated Tx/Rx units providing a respective field of view of the multiple fields of view.

24. The system of claim 19, wherein the first output includes coordinates for the portion of the surroundings, and wherein the LiDAR positions the HRR using the coordinates.

25. The system of claim 17, wherein the first sensor is the infrared camera, and wherein the first output indicates that the portion of the surroundings has a different temperature than another portion of the surroundings.

26. The system of claim 25, wherein the infrared camera selects the portion of the surroundings to be indicated by the first output based on the portion of the surroundings having a greater temperature than the other portion of the surroundings.

27. The system of claim 25, wherein the first output includes only information identifying the portion of the surroundings, and does not identify the other portion of the surroundings.

28. The system of claim 17, wherein the first sensor is the event-based sensor, and wherein the first output indicates a different motion of the portion of the surroundings than another portion of the surroundings.

29. The system of claim 28, wherein the event-based sensor selects the portion of the surroundings to be indicated by the first output based on the portion of the surroundings having greater motion than the other portion of the surroundings.

30. The system of claim 28, wherein the first output includes only information identifying the portion of the surroundings, and does not identify the other portion of the surroundings.

31. The system of claim 17, wherein the second sensor is not any of the infrared camera or the event-based sensor.

32. The system of claim 17, wherein the perception component in part includes a transformation component, and wherein the first output is transformed using the transformation component before being received by the LiDAR.

33. The system of claim 17, wherein at least the first sensor and the LiDAR are positioned within a common housing of the system.

* * * * *